(12) United States Patent
Westerhoff et al.

US011667550B2

(10) Patent No.: US 11,667,550 B2
(45) Date of Patent: Jun. 6, 2023

(54) PHOTOELECTROCATALYTIC DEVICE FOR WATER DISINFECTION

(71) Applicants: Paul K. Westerhoff, Scottsdale, AZ (US); Francois Perreault, Tempe, AZ (US); Sergio Garcia-Segura, Tempe, AZ (US); Shahnawaz Sinha, Chandler, AZ (US); Ana Barrios, Tempe, AZ (US); Renato Martin Montenegro Ayo, Lima (PE)

(72) Inventors: Paul K. Westerhoff, Scottsdale, AZ (US); Francois Perreault, Tempe, AZ (US); Sergio Garcia-Segura, Tempe, AZ (US); Shahnawaz Sinha, Chandler, AZ (US); Ana Barrios, Tempe, AZ (US); Renato Martin Montenegro Ayo, Lima (PE)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 21 days.

(21) Appl. No.: 17/245,640

(22) Filed: Apr. 30, 2021

(65) Prior Publication Data

US 2021/0340034 A1 Nov. 4, 2021

Related U.S. Application Data

(60) Provisional application No. 63/017,953, filed on Apr. 30, 2020.

(51) Int. Cl.
*C02F 1/46* (2023.01)
*C02F 1/461* (2023.01)
(Continued)

(52) U.S. Cl.
CPC ............ *C02F 1/46109* (2013.01); *A45F 3/18* (2013.01); *C02F 1/325* (2013.01); *C02F 1/4672* (2013.01);
(Continued)

(58) Field of Classification Search
CPC ................. C02F 1/45; C02F 1/32; A45F 3/18
See application file for complete search history.

(56) References Cited

U.S. PATENT DOCUMENTS

| 2005/0279679 A1* | 12/2005 | Baarman ................ B01J 19/123 250/435 |
| 2013/0140244 A1* | 6/2013 | Barry .................. C02F 1/46109 210/243 |

(Continued)

OTHER PUBLICATIONS

CN-108486632-A, Sep. 2018, CN; Fan G B82Y30/00 (Year: 2018).*
(Continued)

*Primary Examiner* — Walter D. Griffin
*Assistant Examiner* — Cameron J Allen
(74) *Attorney, Agent, or Firm* — Fish & Richardson P.C.

(57) ABSTRACT

A water-disinfecting apparatus includes a vessel with a cathode, an insert with a photoanode, an ultraviolet light source configured to be positioned in the insert, and a power source. The cathode forms an electrically conductive layer on an inner surface of the vessel. The photoanode is configured to be positioned in the cathode. The power source is configured to be operably coupled to the cathode, the photoanode, and the light source.

22 Claims, 8 Drawing Sheets

(51) Int. Cl.
*C02F 1/467* (2023.01)
*C02F 1/32* (2023.01)
*A45F 3/18* (2006.01)
*A45F 3/00* (2006.01)

(52) U.S. Cl.
CPC .................. *A45F 2003/003* (2013.01); *C02F 2001/46142* (2013.01); *C02F 2001/46171* (2013.01); *C02F 2201/009* (2013.01); *C02F 2303/04* (2013.01); *C02F 2305/023* (2013.01); *C02F 2305/10* (2013.01); *C02F 2307/02* (2013.01)

(56) References Cited

U.S. PATENT DOCUMENTS

2013/0270196 A1* 10/2013 Barry .................. C25B 1/55 210/748.14
2017/0280737 A1* 10/2017 Liao .................. C02F 1/325

OTHER PUBLICATIONS

CN-101891283-A; Nov. 2010; CN'; Lu (Year: 2010).*
[No Author Listed], The Sustainable Development Goals Report 2018. United Nations, Department of Economic and Social Affairs, 2018, 40 pages.
[No Author Listed], Procedures for the recovery of Legionella from the Environment. U.S. Department of Health and Human Services, 2005, 15 pages.
Adusei-Gyamfi, J., Ouddane, B., Rietveld, L., Comard, J.P., Criquet, J., 2019, Natural organic matter-cations complexation and its impact on water treatment: A critical review. Water Res. 160, 130-147. https://doi.org/10.1016/j.watres.2019.05.064.
Amit, R.K., Sasidharan, S., 2019. Measuring affordability of access to clean water: A coping cost approach. Resour. Conserv. Recycl. 141, 410-417. https://doi.org/10.1016/j.resconrec.2018.11.003.
Awfa, D., Ateia, M., Fujii, M., Yoshimura, C., 2020. Photocatalytic degradation of organic micropollutants: Inhibition mechanisms by different fractions of natural organic matter. Water Res. 174, 115643, 11 pages. https://doi.org/10.1016/j.watres.2020.115643.
Bessegato, G.G., Cardoso. J.C., Zanoni, M.V.B., 2015. Enhanced photoelectrocatalytic degradation of an acid dye with boron-doped TiO2 nanotube anodes. Catal. Today 240, 100-106. https://doi.org/10.1016/j.cattod.2014.03.073.
Brunkard, J.M., Ailes, E., Roberts, V.A., Hill, V., Hilborn, E.D., Craun, G.F., Rajasingham, A., Kahler, A., Garrison, L., Hicks, L., Carpenter, J., Wade, T.J., Beach, M.J., Yoder, J.S., 2011. Surveillance for waterborne disesase outbreaks associated with drinking water—United States, 2007-2008. CDC Surveill. Summ. 38-68.
Cardoso. J.C., Bessegato, G.G., Boldrin Zanoni, M.V., 2016. Efficiency comparison of ozonation, photolysis, photocatalysis and photoelectrocatalysis methods in real textile wastewater decolorization. Water Res. 98, 39-46. https://doi.org/10.1016/j.watres.2016.04.004.
CDC.gov [online], Guideliens for Prevention of Nosocomial Pneumonia, Jan. 3, 1997, retrieved on Aug. 3, 2022, retrieved from URL <https://www.cdc.gov/mmrwr/preview/mmwrhtml/00045365.htm>, 30 pages.
Cerrón-Calle, G.A., Aranda-Aguirre. A.J., Luyo, C., Garcia-Segura, S., Alarcón, H., 2019. Photoelectrocatalytic decolorization of azo dyes with nano-composite oxide layers of ZnO nanorods decorated with Ag nanoparticles. Chemosphere 219, 296-304. https://doi.org/10.1016/j.chemosphere.2018.12.003.
Chen. J., Loeb, S., Kim. J., 2017. LED revolution: fundamentals and prospects for UV disinfection applications. Environ. Sci. Water Res. Teclnol. 3, 188-202, https://doi.org/10.1039/C6EW00241B.
Cheng. Y.W., Chan, R.C.Y., Wong. P.K., 2007. Disinfection of Legionella pneumophila by photocatalytic oxidation. Water Res. 41, 842-852. https://doi.org/10.1016/j.watres.2006.11.033.

Cossali, G., Routledge, E.J., Ratcliffe, M.S., Blakes, H., Fielder, J.E., Karayiannis, T.G., 2016. Inactivation of *E. coli*, Legionella, and Pseudomonas in Tap Water Using Electrochemical Disinfection. J. Environ. Eng. 142, 04016063, 11 pages. https://doi.org/10.1061/(asce)ee.1943-7870.0001134.
Cutler. D., Miller, G., 2005. The Role of Public Health Improvements in Health Advances: The Twentieth-Century United States. Demography 42, 1-22.
Das, T.K., Ilaivaraja. P., Mocherla. P.S.V., Bhalerao. G.M., Sudakar, C., 2016. Influence of surface disorder, oxygen defects and bandgap in TiO2 nanostructures on the photovoltaic properties of dye sensitized solar cells. Sol. Energy Mater. Sol. Cells 144, 194-209. https://doi.org/10.1016/j.solmat.2015.08.036.
De Luna, M.D.G. De, Laciste, M.T., Tolosa, N.C., Lu, M., 2018. Effect of catalyst calcination temperature in the visible light photocatalytic oxidation of gaseous formaldehyde by multi-element doped titanium dioxide. Environ. Sci. Pollut. Res. 25, 15216-15225.
Diaz-Real, J.A., Ortiz-Ortega, E., Gurrola, M.P., Ledesma-Garcia. J., Arriaga. L.G., 2016. Light-harvesting Ni/TiO2 nanotubes as photo-electrocatalyst for alcohol oxidation in alkaline media. Electrochim. Acta 206, 388-399. https://doi.org/10.1016/j.electacta.2016.04.163.
Dimapilis, E.A.S., Hsu. C., Mendoza, R.M.O., Lu. M., 2018. Zinc oxide nanoparticles for water disinfection. Sustain. Environ. Res. 28, 47-56. https://doi.org/10.1016/j.serj.2017.10.001.
Environmental Protection Agency, "Drinking water contaminant candidate list 3: final," Fed. Regist., 2009, 74(194):51850-51862.
Environmental Protection Agency, "National primary drinking water regulations: revisions to the total coliform rule," Fed. Regist., 2013, 78(30):10270-10365.
EPA.gov, "Microbial Contaminants—CCL 4: Final CCL 4 Microbial Contaminants," available on or before Jan. 22, 2017, via Internet Archive: Wayback Machine URL <http://web.archive.org/web/20170122014937/https://www.epa.gov/ccl/microbial-contaminants-ccl-4>. retrieved on Aug. 3, 2022, URL <https://www.epa.gov/ccl/microbial-contaminants-ccl-4>, 4 pages.
Fagan, R., Mccormack, D.E., Dionysiou, D.D., Pillai, S.C., 2016. A review of solar and visible light active TiO2 photocatalysis for treating bacteria, cyanotoxins and contaminants of emerging concern. Mater. Sci. Semicond. Process. 42, 2-14. https://doi.org/10.1016/j.mssp.2015.07.052.
Feeley. J.C. et al., 1979. Charcoal-yeast extract agar: primary isolation medium for Legionella pneumophila. J. Clin. Microbiol. 4, 437-441.
Garcia-Segura, S., Briilas, E., 2017. Applied photoelectrocatalysis on the degradation of organic pollutants in wastewaters. J. Photochem. Photobiol. C Pbotochem. Rev. 31, 1-35. https://doi.org/10.1016/j.jphotochemrev.2017.01.005.
Garcia-Segura, S., Nienhauser, A.B., Fajardo, A.S., Bansal, R., Coonrod, C.L., Fortner, J.D., Marcos-Hernández. M., Rogers. T., Villagran, D., Wong, M.S., Westerhoff, P., 2020. Disparities between Experimental and Environmental Conditions: Research Steps Towards Making Electrochemical Water Treatment a Reality. Curr. Opin. Electrochem. 22, 9-16. https://doi.org/10.1016/j.coelec.2020.03.001.
Garcia-Segura, S., Tugaoen, H.O.N., Hristovski, K., Westerhoff, P., 2018. Photon flux influence on photoelectrochemical water treatment. Electrochem. Commun. 87, 63-65. https://doi.org/10.1016/j.elecom.2017.12.026.
Jiménez-Tototzintle, M., Ferreira, I.J., da Silva Duque, S., Guimaraes Barrocas, P.R., Saggioro, E.M., 2018. Removal of contaminants of emerging concern (CECs) and antibiotic resistant bacteria in urban wastewater using UVA/TiO2/H2O2 photocatalvsis. Chemosphere 210, 449-457. https://doi.org/10.1016/j.chemosphere.2018.07.036.
Jung. Y.T., Naravanan, N.C., Cheng. Y.L., 2018. Cost comparison of centralized and decentralized wastewater management systems using optimization model. J. Environ. Manage. 213, 90-97. https://doi.org/101016/j.jenvman.2018.01.081.
Liang, K., Tay, K., Kupreeva, O. V, Orekhovskaya, T.I., Lazarouk, S.K., Borisenko, V.E., 2014. Fabrication of double-walled titania nanotubes and their photocatalytic activity. ACS Sustain. Chem. Eng. 2, 991-995. https://doi.org/10.1021/sc4002142.

(56) References Cited

OTHER PUBLICATIONS

Mais, L., Mascia, M., Palmas, S., Vacca, A., 2019, Photoelectrochemical oxidation of phenol with nanostructured TiO2-PANI electrodes under solar light irradiation. Sep. Purif. Technol. 208, 153-159. https//doi.org/10.1016/j.seppur.2018.03.074.

Malayeri, A.H., Mohseni, M., Cairns, B., Bolton, J.R., Barbeau, B., Wright, H., Linden, K.G., 2016. Fluence (UV Dose) Required to Achieve Incremental Log Inactivation of Bacteria, Protozoa, Viruses and Algae. IUVA News, 18, 4-6, 42 pages.

Marcelino, R.B.P.. Amorim. C.C., 2019. Towards visible-light photocatalysis for environmental applications: band-gap engineering versus photons absorption—a review. Environ. Sci. Pollut. Res. 26, 4155-4170.

Martinez-Huitle, C.A., Briilas, E., 2008. Electrochemical alternatives for drinking water disinfection. Angew. Chemie—Int. Ed. 47, 1998-2005. https://doi.org/10.1002/anie.200703621.

Martinez-Santos, P., 2017. Does 91% of the world's population really have "sustainable access to safe drinking water"? Int. J. Water Resour. Dev. 33. 514-533. https://doi.org/10.1080/07900627.2017.1298517.

Manter. M.S., Zucker, I., Perreault, F., Werber, J.R., Kim, J.H., Elimelech. M., 2018. The role of nanotechnology in tackling global water challenges. Nat. Sustain. 1, 166-175. https://doi.org/10.1038/s41893-018-0046-8.

McBurnett, L.R., Holt, N.T., Alum, A., Abbaszadegan, M., 2018. Legionella—A threat to groundwater: Pathogen transport in recharge basin. Sci. Total Environ. 621, 1485-1490. https://doi.org/10.1016/j.scitotenv.2017.10.080.

Montenegro-Avo, R., Morales-Gomero. J.C., Alarcon, H., Cotillas, S., Westerho. P., Garcia-segura, S., 2019. Scaling up photoelectrocatalytic Reactors: A TiO2 nanotube-coated disc compound reactor effectively degrades acetaminophen. Water 11, 2522, 14 pages.

Moreira, F.C., Boaventura, R.A.R., Briilas, E., Vilar, V.J.P., 2017. Electrochemical advanced oxidation processes: A review on their application to synthetic and real wastewaters. Appl. Catal. B Environ. 202, 217-261. https://doi.org/10.1016/j.apcatb.2016.08.037.

O'Neal Tugaoen, H., Garcia-Sezara. S., Hristovski. K., Westerhoff, P., 2018. Compact light-emitting diode optical fiber immobilized TiO2 reactor for photocatalytic water treatment. Sci. Total Environ. 613-614. 1331-1338. https://doi.org/10.1016/j.scitotenv.2017.09.242.

Pablos, C., Marugán, J., Adán, C., Osuna, M., van Grieken, R., 2017. Performance of TiO2 photoanodes toward oxidation of methanol and *E. coli* inactivation in water in a scaled-up photoelectrocatalytic reactor. Electrochim. Acta 258, 599-606. https://doi.org/10.1016/j.electacta.2017.11.103.

Parker Fiebelkorn, A., Person. B., Quick, R.E., Vindigni, S.M., Jhung, M., Bowen, A., Riley. P.L., 2012. Systematic review of behavior change research on point-of-use water treatment interventions in countries categorized as low- to medium-development on the human development index. Soc. Sci. Med. 75, 622-633. https://doi.org/10.1016/j.socscimed.2012.02.011.

Pichel, N., Vivar, M., Fuentes, M., 2019. The problem of drinking water access: A review of disinfection technologies with an emphasis on solar treatment methods. Chemosphere 218, 1014-1030. https://doi.org/10.1016/j.chemosphere.2018.11.205.

Pires. R.H., Brugnera, M.F., Zanoni, M.V.B., Giannini, M.J.S.M., 2016. Effectiveness of photoelectrocatalysis treatment for the inactivation of Candida parapsilosis sensu stricto in planktonic cultures and biofilms. Appl. Catal. A Gen. 511, 149-155. https://doi.org/10.1016/j.apcata.2015.11.036.

Rather, R.A., Lo, I.M.C., 2020. Photoelectrochemical sewage treatment by a multifunctional g-C3N4/Ag/AgCl/BiVO4 photoanode for the simultaneous degradation of emerging pollutants and hydrogen production, and the disinfection of *E. coli*. Water Res. 168, 115166. 9 pages. https://doi.org/10.1016/j.watres.2019.115166.

Rommozzi, E., Giannakis, S., Giovannetti, R., Vione, D., Pulgarin, C., 2020. Detrimental vs. beneficial influence of ions during solar (SODIS) and photo-Fenton disinfection of *E. coli* in water: (Bi)carbonate, chloride, nitrate and nitrite effects. Appl. Catal. B Environ, 270. 118877. 16 pages. https://doi.org/10.1016/j.apcatb.2020.118877.

Schwake, D.O., Alum. A., Abbaszadegan, M., 2015. Impact of environmental factors on legionella populations in drinking water. Pathogens 4, 269-282. https://doi.org/10.3390/pathogens4020269.

Sillanpää. M., Ncibi, M.C., Matilainen. A., 2018. Advanced oxidation processes for the removal of natural organic matter from drinking water sources: A comprehensive review. J. Environ. Manage. 208, 56-76. https://doi.org/10.1016/j.jenvman.2017.12.009.

Spasiano, D., Marotta. R., Malato. S., Fernandez-Ibañez, P., Di Somma, I., 2015. Solar photocatalvsis: Materials, reactors, some commercial, and pre-industrialized applications. A comprehensive approach. Appl. Catal. B Environ. 170-171, 90-123. https://doi.org/10.1016/j.apcatb.2014.12.050.

Stanfield, G., LeChevallier, M., Snozzi, M., 2003. "Treatment Efficiency," Assessing Microbial Safety of Drinking Water: Improving Approaches and Methods. 24 pages. https://doi.org/10.1787/9789264099470-en.

Tseng. W.J., Chuang, Y.C., Chen, Y.A., 2018. Mesoporous Fe3O4@Ag@TiO2 nanocomposite particles for magnetically recyclable photocatalysis and bactericide. Adv. Powder Technol. 29, 664-671. https://doi.org/10.1016/j.apt.2017.12.008.

Water Treatment and Pathogen Control: Process Efficiency in Achieving Safe Drinking Water, LeChevallier and Au, Aug. 2004, Chapter 3, 25 pages.

Westerhoff. P., Nalinakumari. B., Pei, P., 2006. Kinetics of MIB and geosmin oxidation during ozonation. Ozone Sci. Eng. 28, 277-286. https://doi.org/10.1080/01919510600892836.

\* cited by examiner

PHOTOELECTROCATALYTIC DEVICE FOR WATER DISINFECTION

CROSS-REFERENCE TO RELATED APPLICATION

This application claims the benefit of U.S. Patent Application No. 63/017,953 entitled "PHOTOCATALYTIC DEVICE FOR WATER DISINFECTION" and filed on Apr. 30, 2020, which is incorporated by reference herein in its entirety.

STATEMENT OF GOVERNMENT INTEREST

This invention was made with government support under 1449500 awarded by the National Science Foundation. The government has certain rights in the invention.

TECHNICAL FIELD

This invention relates to a photoelectrocatalytic device for disinfection of water, such as drinking water.

BACKGROUND

Bacteria, viruses, and other harmful microorganisms pose a significant pathogenic health-related risk to safe drinking water. Disinfection by chlorination is commonly practiced, however, chlorine is a toxic chemical that typically requires careful storage and proper handling. While ultraviolet (UV) disinfection can be effective, UV-based processes generally rely on photons (light) for sterilization (photolysis), and the efficacy can be affected by factors such as lamp power, UV-dose, reaction time, and proximity of the UV light to the microorganisms. In addition, these technologies are generally unable to detoxify pesticides, herbicides, algal toxins, or other chemical (non-biological) pollutants in water.

SUMMARY

A photoelectrocatalytic (PEC) device for water disinfection is described. The PEC device includes a PEC reactor with semiconductor-coated walls, and disinfects water with in-situ generation of oxidants. The photocatalytic device provides safe, disinfected drinking water based on PEC technology, without the need for chlorine or chemical-based oxidants. In some implementations, the photocatalytic device is fabricated in a compact design suitable for portable operation. In other implementations, the photocatalytic device is fabricated in a design suitable for a point-of-use (POU) household water treatment system. Advantages include portability, ease of operation, rapid disinfection, and the capability to oxidize organic pollutants.

In a general aspect, a water-disinfecting apparatus includes a vessel with a cathode, an insert configured to be positioned in the vessel, an ultraviolet light source configured to be positioned in the insert, and a power source. The cathode includes an electrically conductive layer on an inner surface of the vessel. The insert includes a photoanode. The power source is configured to be operably coupled to the cathode, the photoanode, and the light source.

Implementations of the general aspect may include one or more of the following features.

In some implementations, the vessel has a volume of about 1 L or less. In some implementations, the vessel has a volume of about 1 L or greater. The vessel can be configured to be operatively coupled to a water source (e.g., a water faucet). The vessel can have a removable lid. In some cases, the vessel is a drinking vessel (e.g., a self-disinfecting water bottle).

In some implementations, the outer surface of the vessel is electrically insulating.

In some implementations, the vessel is cylindrical. The photoanode can be in the form of a cylindrical metal substrate with a photoactive semiconductor material on an inner surface of the cylindrical metal substrate. The cylindrical metal substrate defines openings configured to allow liquid to pass from an inside of the cylindrical metal substrate to the outside of the cylindrical substrate and vice versa. The photoactive semiconductor material can include titanium dioxide nanostructures (e.g., titanium dioxide nanorods or nanotubes).

In some implementations, the ultraviolet light source includes a light emitting diode. The ultraviolet light source can be configured to emit ultraviolet radiation having a wavelength of 365 nm.

In some implementations, the power source includes a rechargeable battery. The power source can be removably coupled to a lid configured to seal the vessel.

In some implementations, the apparatus is configured to generate hydroxyl radicals from water in the vessel. The power source can be configured to provide a constant anodic current to inhibit recombination of reductant electrons and oxidant vacancies in the water.

In some implementations, when the insert is positioned in the vessel, an annular space is defined between an outer surface of the photoanode and an inner surface of the cathode. The ultraviolet light source can be configured to be positioned concentrically within the photoanode.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

A photoelectrocatalytic (PEC) device for water disinfection is described. The PEC device includes an insulated rechargeable battery and a PEC reactor. The PEC reactor disinfects water with in-situ generation of oxidants. The PEC device provides safe, disinfected drinking water based on PEC technology, without the need for chlorine or chemical-based oxidants. In some implementations, the photocatalytic device is fabricated in a compact design suitable for portable operation. In other implementations, the photocatalytic device is fabricated in a design suitable for a point-of-use (POU) household water treatment system.

The PEC reactor includes a light emitting diode (LED), a photoanode, and a cathode on an interior surface of a vessel configured to contain water. Ultraviolet (UV) light from the LED (e.g., 365 nm) provides photonic energy to generate in-situ oxidants from a photocatalytic reaction using a semiconductor material on the photoanode. Suitable semiconductor materials include, for example, nanostructured titanium dioxide ($TiO_2$) nanotubes.

Figure 1A:
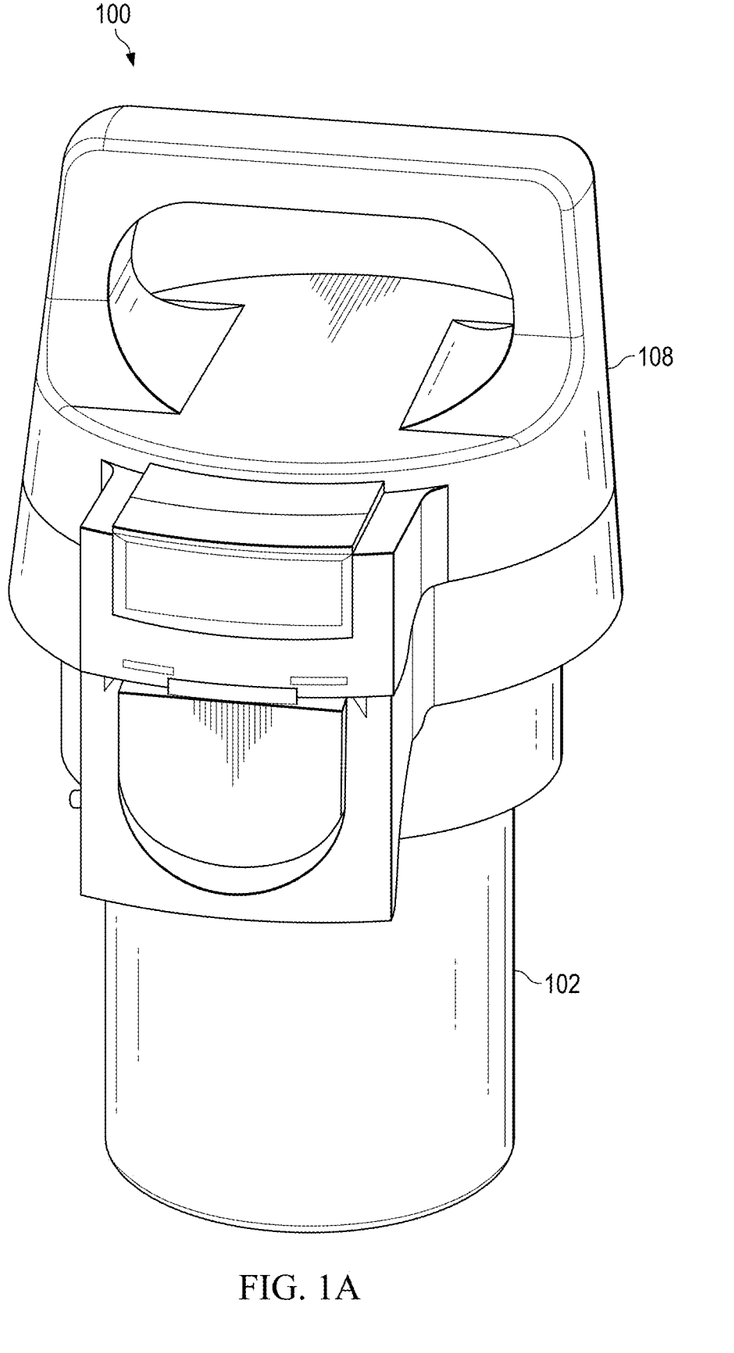
FIG. 1A is a perspective view of a photoelectrocatalytic (PEC) device for water disinfection.
Figure 1B:
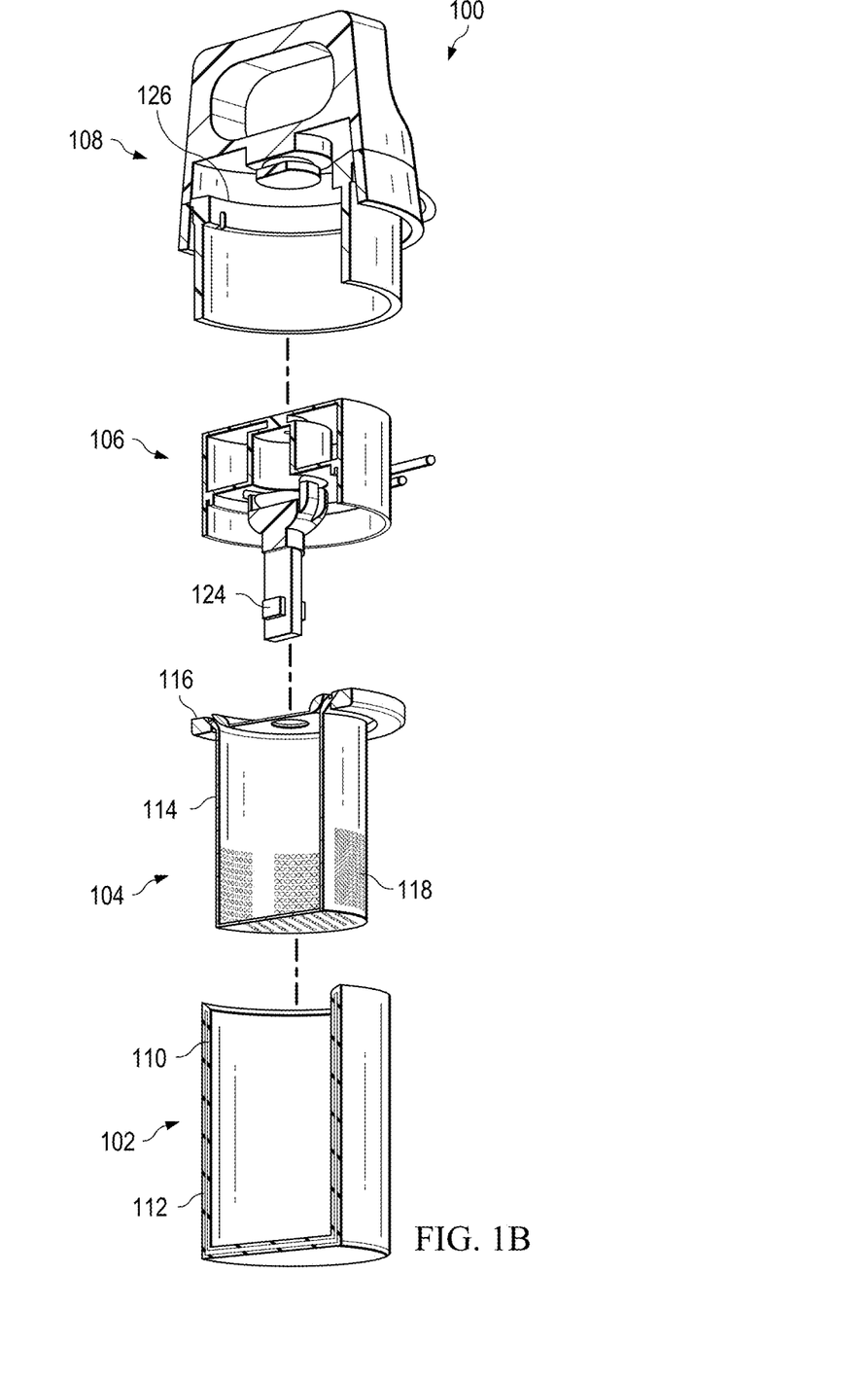
FIG. 1B is an exploded cutaway view of the device in FIG. 1A.
Figure 2A:
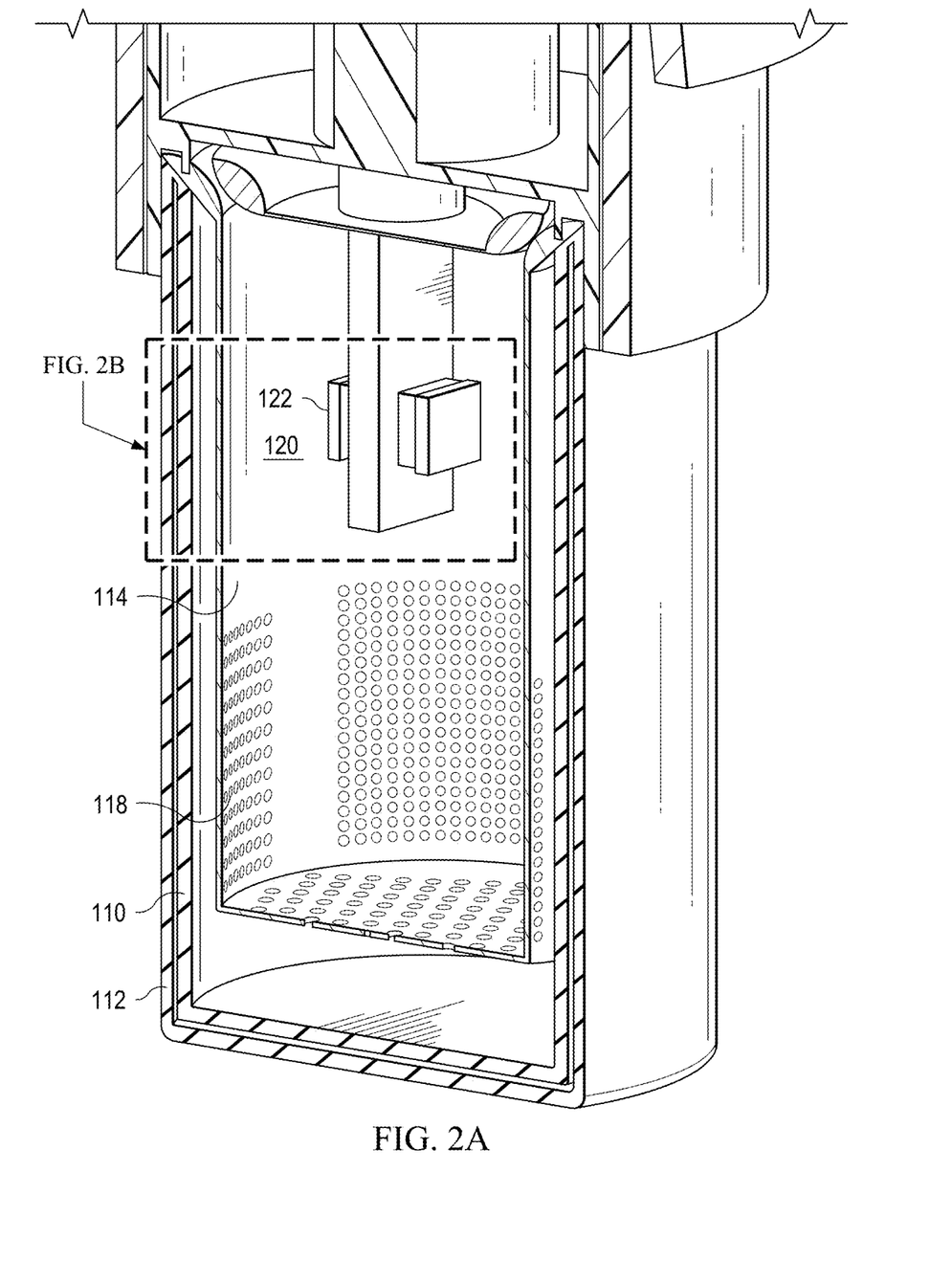
FIG. 2A is an enlarged cutaway view of the PEC device of FIG. 1A.
Figure 2B:
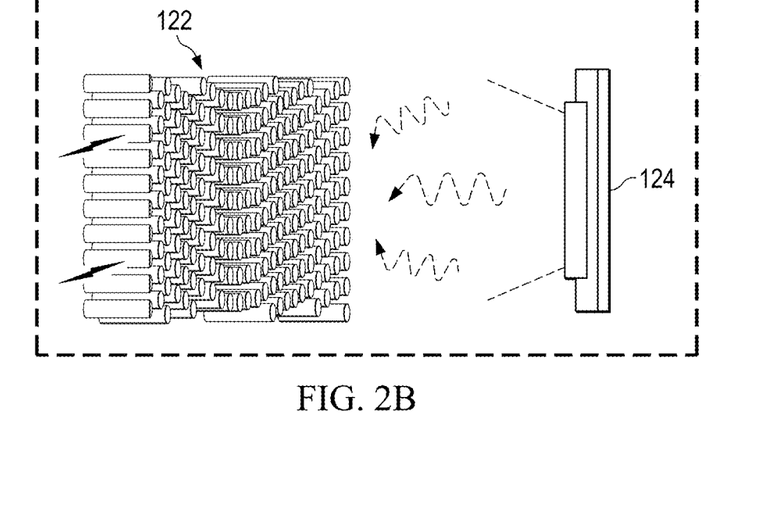
FIGS. 2B and 2C depict photoelectrocatalytic inactivation of pathogens in water contained in the PEC device.
Figure 2C:
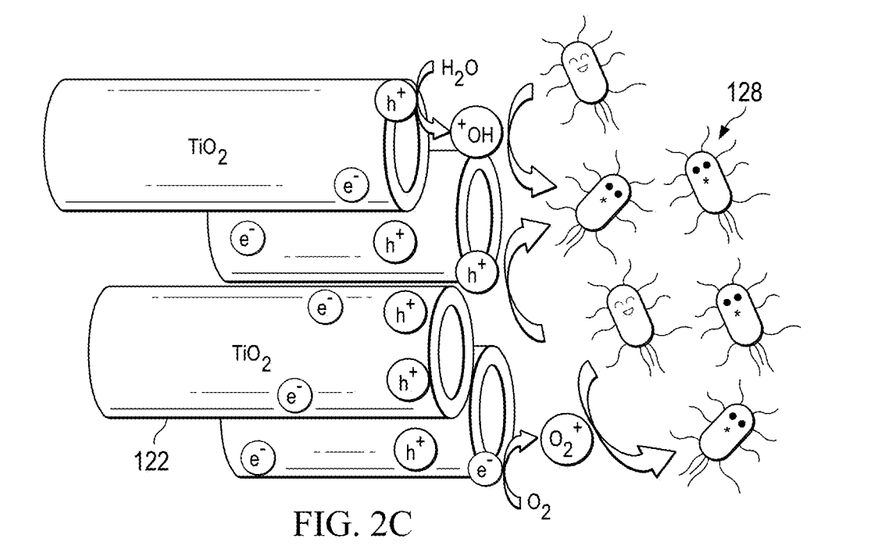

FIG. 1A depicts exemplary photoelectrocatalytic (PEC) device 100. FIG. 1B is an exploded cutaway view of PEC device 100. FIG. 2A is a cutaway view of a portion of FIG. 1A. FIGS. 2B and 2C depict photoelectrocatalytic disinfection of water contained in PEC device 100. As depicted, PEC device 100 is a portable point-of-use device, such as a self-disinfecting water bottle. PEC device 100 includes base 102, insert 104, LED assembly 106, and lid 108.

Base 102 serves as a vessel in which water is treated. A volume of the vessel can range from milliliters to liters and greater (e.g., kiloliters). Base 102 can be a double-walled vessel with cathode 110 and cover 112. Cathode 110, configured to contain water to be treated, defines the interior surface of the double-walled base. Cathode 110 is formed of a food-safe, electrically conductive material, such as titanium or stainless steel. Cover 112 is an electrically insulating material that surrounds an exterior surface of cathode 110 and insulates the cathode from an exterior surface of PEC device 100. In some cases, cover 112 is formed of a flexible or pliable material. Examples of suitable materials for cover 112 include polymeric materials, such as natural and synthetic rubber.

Insert 104 is formed of an electrically conductive material and is of a suitable size and shape to be positioned in base 102. Insert 104 includes photoanode 114 and insulating spacer 116. Insulating spacer 116 ensures electrical isolation of photoanode 114 and cathode 110 when insert 104 is positioned in base 102. In one example, insulating spacer 116 is formed of TEFLON. Photoanode 114 defines openings 118 (e.g., in the form of a mesh) that allow liquid to flow from an interior of insert 104 into an annular space defined by an exterior surface of photoanode 114 and an interior surface of cathode 110. Photoanode 114 includes electrically conductive substrate 120 with photoactive semiconductor material 122. The photoactive semiconductor material is selected to be safe and stable, such that the semiconductor material does not degrade or leach out to water in the vessel during operation (i.e., with applied current or photoirradiation). Photoactive semiconductor material 122 is deposited on or forms at least a portion of the surfaces of photoanode 114. In one example, as depicted in FIGS. 2A-2C, electrically conductive substrate 120 is titanium, and photoactive semiconductor material 122 is in the form of $TiO_2$ nanostructures (e.g., nanotubes) extending (e.g., in a perpendicular direction) from a surface of the titanium substrate.

As described herein, $TiO_2$ nanostructures 122 can be grown by anodization from titanium substrate 120. In one example, $TiO_2$ nanotubes are generated using a high potential anodization technique (i.e., 40 V in the presence of 0.3% $NH_4F$ in ethylene glycol; grown at 450° C. for 2 hours, which leads to formation of anatase nanotubes). This renders a resilient and highly stable nanostructured coating on the photoanode surface. These hierarchically organized nanotubes can grow through the anodization process of a titanium pre-shaped electrode.

LED assembly 106 includes one or more submergible UV LED lamps 124. In some cases, UV LED lamp 124 is a two-sided lamp. Lid 108 includes a rechargeable battery 126 that feeds UV-LED lamp 124 and provides a small current for PEC operation.

The PEC device operates by applying a low current (0-20 mA) across the cathode and photoanode using a power source (e.g., a rechargeable battery) during disinfection. In one implementation, the vessel is sized to contain an amount of water (e.g., 0.25 L to 1 L) suitable for use as a supply of drinking water for off-grid application (e.g., water in a small vessel for drinking or in a larger vessel as a household point-of-use (POU) device for attachment to a water source (e.g., a water faucet or a showerhead).

The PEC device achieves efficient disinfection of water including microbes 128 (e.g., bacteria) in seconds by the PEC in situ generation of disinfecting and detoxifying reactive oxygen species (ROS) oxidants (i.e., hydroxyl radical [.OH]) as opposed to other oxidants (e.g., chlorine, ozone). These oxidants (i.e., .OH) are generated within the vessel, solely during its operation, and form within a short time (<70 ns), which ensures their absence (i.e., without residuals, unlike chlorine) in the treated water immediately after the off-period and before consumption. The production of disinfectants takes place on the active photoanode (oxidation) surface, as shown by the reactions below.

$$\text{Semiconductor} + h\nu \rightarrow h_{vb}^+ + e_{cb}^- \tag{1}$$

$$h_{vb}^+ + H_2O \rightarrow .OH + H^+ \tag{2}$$

$$h_{vb}^+ + e_{cb}^- \rightarrow \text{heat} \tag{3}$$

When a semiconductor photoanode is irradiated with a light source, it emits photons of higher energy than those emitted by the semiconductor material (i.e., $TiO_2$) energy bandgap. This results in excitation and photogeneration of charge carriers according to reaction (1): reductant electrons ($e_{cb}^-$) and oxidant vacancies ($h_{vb}^+$). The photogenerated $h_{vb}^+$ are oxidants that generate hydroxyl radical (i.e., .OH) from water oxidation by reaction (2). The photogenerated charge carriers are in an unstable excited state, which induces their recombination following reaction (3) to return to the lower, original state. However, the application of a constant anodic current causes charge carrier separation by a difference of potential and inhibits or prevents this recombination reaction (3), which increases the accumulation of .OH radicals, as disinfectants for an efficient and faster inactivation. The presence of chloride ion in solution may also promote the yield of some active chlorine species such as $Cl_2$ and $HClO/ClO^-$. Advantages of this electrochemically driven process include the low amount of current required to positively impact performance, which can be provided by a small rechargeable battery. Also, it is a low energy system, using light-emitting diodes (LED) to reduce its overall energy requirements for the light sources.

EXAMPLE

A photoanode was prepared by electrochemical anodization on a pristine Ti meshed insert. The Ti substrate was polished with sandpaper and degreased with acetone. Anodization was conducted in a solution of ethylene glycol containing 0.3% $NH_4F$ and 2 vol % of water by applying 40 V for 2 h. The Ti meshed insert was used as an anode and a titanium rod placed concentrically in the cup was used as a cathode. The equidistant distance with all the circumference of the anode allowed uniform growth of $TiO_2$ along the inner circumference of the cylinder. Grown nanotubes were annealed at 450° C. for 2 h with a heating ramp of 10° C. $min^{-1}$ in a muffle furnace. The thermal treatment allowed recrystallization of $TiO_2$ as anatase.

All chemicals and supplies described in these procedures were analytical grade obtained from Fisher Scientific and Millipore-Sigma. Solutions were prepared with nano-pure water obtained from a Millipore Milli-Q system with resistivity greater than 18.2 MΩ cm at 25° C., except for the experiments conducted in real water matrix that used natural water collected from a recreational water reservoir (AZ, USA). Collected samples were filtered with previously ashed 0.2 μm nylon filters and spiked with $1 \times 10^{-5}$ CFU $mL^{-1}$ of *E. coli* prior to treatment.

Raman spectroscopy of $TiO_2$ nanotubes was conducted on a WITec alpha300R confocal Raman microscope system with a 532 nm excitation laser and 100× objective lens with ~1 μm laser spot size. The laser power was kept below 1 mW to minimize damage to the samples. Spectra were obtained using the 1800 g $mm^{-1}$ grating and 5 s acquisition time. Morphology of the functionalized $TiO_2$ nanotubes was examined using a scanning electron microscope (SEM) XL30 Environmental FEG. Photon irradiance was quantified with a radiometer with cosine corrector Avantes AvaSpec 2048 spectrometer. Photocurrent responses were recorded within one-compartment cell using a PGSTAT302n potentiostat-galvanostat from Metrohm controlled by Autolab Nova 2.1 software at a constant bias anodic potential of 2.0 V vs Ag/AgCl using 0.5 M $Na_2SO_4$ solutions at pH 7.0 under UV LED on/off cycles of 20 s. The $TiO_2$ nanotube anode was the working electrode, Pt wire was the counter electrode, and Ag/AgCl was used as reference electrode.

Before the microbiological tests, all glassware and media were autoclaved for sterilization at 120° C. for 2 h. *Escherichia coli* (*E. coli*) W3110 (American Type Culture Collection ATCC 11303) were grown overnight in Lysogeny Broth (LB) at 37° C. on a shaker plate at 140 rpm in an Isotemp incubator (Fisher Scientific). The culture was then diluted in fresh LB (1:25) and grown under the same conditions until the optical density (OD) reached 1.0, indicating log phase (~2 h). Bacterial cells were washed by centrifugation at 5,000×g for one minute and re-suspended in sterile 0.9% NaCl solution before being diluted to 105 colony-forming units (CFU) $mL^{-1}$ in 350 mL of sterile saline solution. Inactivation experiments were conducted using 350 mL of the saline-bacteria solution. Each experiment was performed three times with duplicate samples. After exposure to the disinfection device, samples were collected every five to ten seconds. The suspensions were diluted (1:10) in Eppendorf tubes, vortexed, and 50 μL of each suspension was transferred onto a LB agar plate for the spread plate technique and then incubated overnight at 37° C. for CFU enumeration.

*L. pneumophila* American Type Culture Collection 33153 were cultured on glycine, polymyxin B, vancomycin and cycloheximide supplemented Buffered Charcoal Yeast Extract (ATCC Medium 1099) (GPVC BCYE) agar. *Legionella* stocks were prepared in accordance with previously described methods. The frozen stock (kept at −80° C.) was carefully taken out using aseptic techniques. The frozen stock was left to thaw, and 100 μL of the thawed stock was taken and spread plated over agar media plate to create a uniform lawn of bacteria. This was left in the incubator at 37° C. under atmospheric $CO_2$ for 72-96 h. The uniform lawn was washed off by 1× strength phosphate-buffered saline (PBS buffer). PBS buffer (lx strength) solution was made to wash off the *Legionella* lawn off the plates and create a suspension. To make 1 L 10× strong buffer, 80 g of NaCl, 2 g of KCl, 14.4 g of $Na_2HPO_4$ and 2.4 g of $K_2HPO_4$ were added to 800 mL of DI/nanopure water. The pH of the solution was adjusted to 6.8, and 200 mL of DI water was added to make the full liter. Serial dilution was done to make the final solution of the required concentration. The pH was kept at 6.9±0.05. The inactivation experiment was conducted using 350 mL of PBS-bacteria solution with a concentration of $3.3 \times 10^5$ CFU $mL^{-1}$. After exposure to the disinfection device, samples were collected every five to ten seconds. The samples were serially diluted (1:4) in Eppendorf tubes, vortexed, and 50 μL of each suspension was spread on a GPVC BCYE agar plate and incubated for 72-96 h at 37° C. for CFU enumeration.

Anionic species were quantified by ion chromatography with a Thermo Dionex ICS-5000 DC coupled to a conductivity detector AERS 500 using a high capacity hydroxide-selective anion-exchange column Dionex Ionpac AS18 (2 mm×250 mm) flowing 30 mM KOH solution as mobile phase at 0.25 mL $min^{-1}$. Dissolved organic carbon (DOC) was measured with a Shimadzu VCSN total organic carbon (TOC) analyzer. The pH of the solutions was determined with a Thermo Scientific Orion Star A221 pH meter.

Figure 3A:
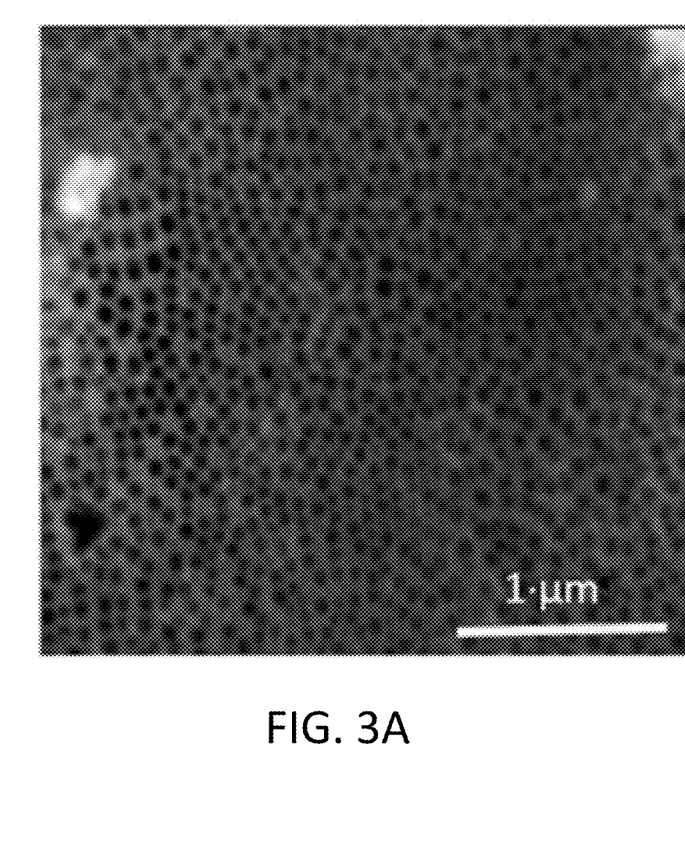
FIGS. 3A and 3B show free surface and cross-sectional scanning electron microscope (SEM) images, respectively, of $TiO_2$ nanotubes on a photoanode of a PEC device.
Figure 3B:
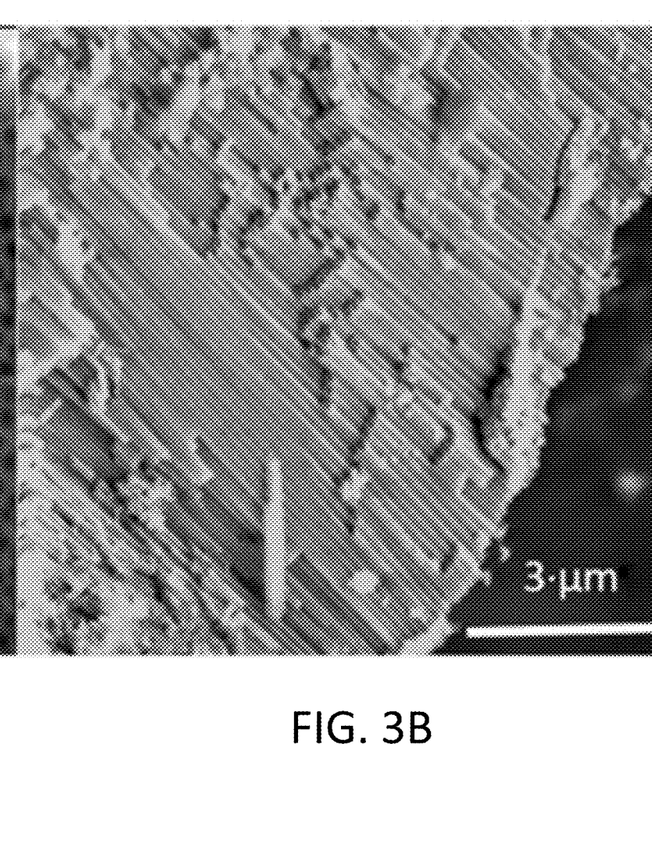
Figure 4A:
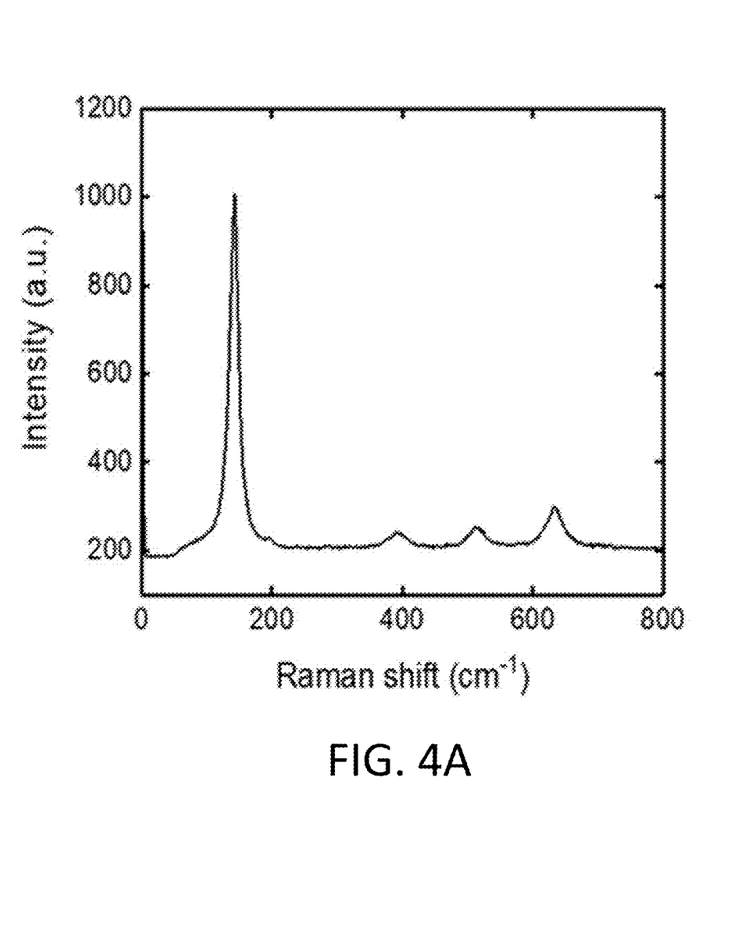
FIGS. 4A and 4B show Raman spectra and photocurrent response registered at constant bias potential of 2.0 V versus Ag|AgCl under on/off irradiation intervals from a 365 nm UV LED light source of 350 $\mu Wcm^{-2}$ irradiance.
Figure 4B:
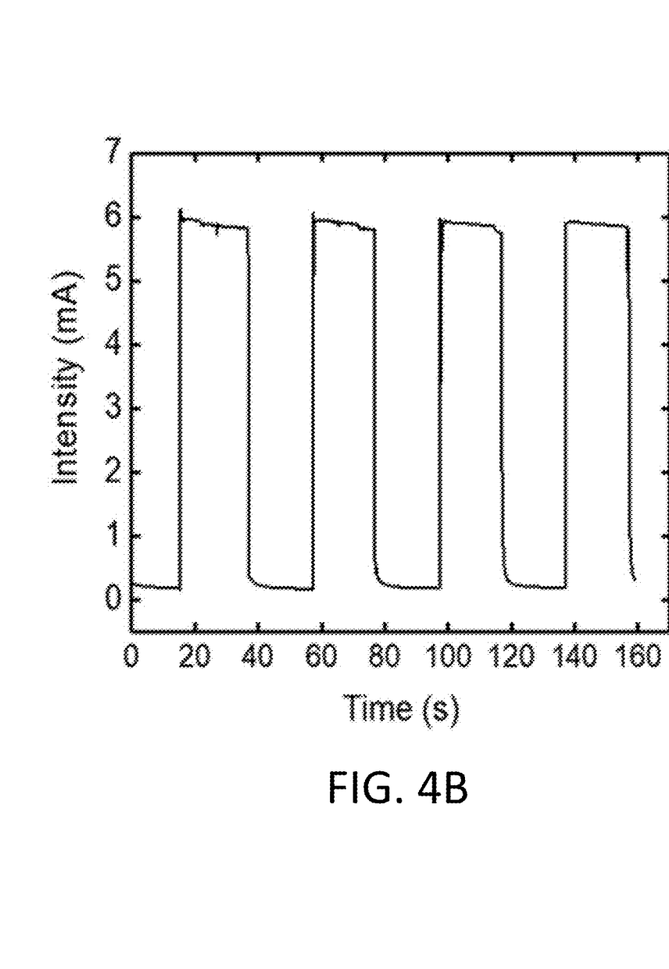

The free surface SEM image of FIG. 3A illustrates a hierarchical distribution of uniform nanotubes formed on the meshed photoanode surface during the anodization synthesis. The $TiO_2$ nanotubes were electrochemically grown through anodization on a commercially cylindrically shaped titanium mesh. Photoelectrode imaging was destructive given the size and geometry of the anode. The cross-section image of FIG. 3B shows a characteristic organization of $TiO_2$ nanotubes grown perpendicularly to the electrode surface. Analysis of different mesh regions depicted similar nanotube size and distribution obtained along the photoanode cylinder. Raman spectroscopy analysis of FIG. 4A shows the characteristic peaks at 146 $cm^{-1}$, 396 $cm^{-1}$, 517 $cm^{-1}$, and 637 $cm^{-1}$, associated with $TiO_2$ anatase phase. This result agrees with the expected preferential formation of anatase during annealing of anodized $TiO_2$ at 450° C. FIG. 4B shows the photocurrent responses registered using the photoanode in the PEC device at constant bias of 2.0 V vs Ag|AgCl under on/off UV irradiation in 20 s intervals. A notable increase on the current response can be observed under light irradiation, which is associated to the efficient photoexcitation of electrons from the valance band to the conduction. These results demonstrate the photocatalytic activity of the nanostructured photoanode implemented in the PEC device for efficient photoelectrocatalytic inactivation of bacteria.

Figure 5A:
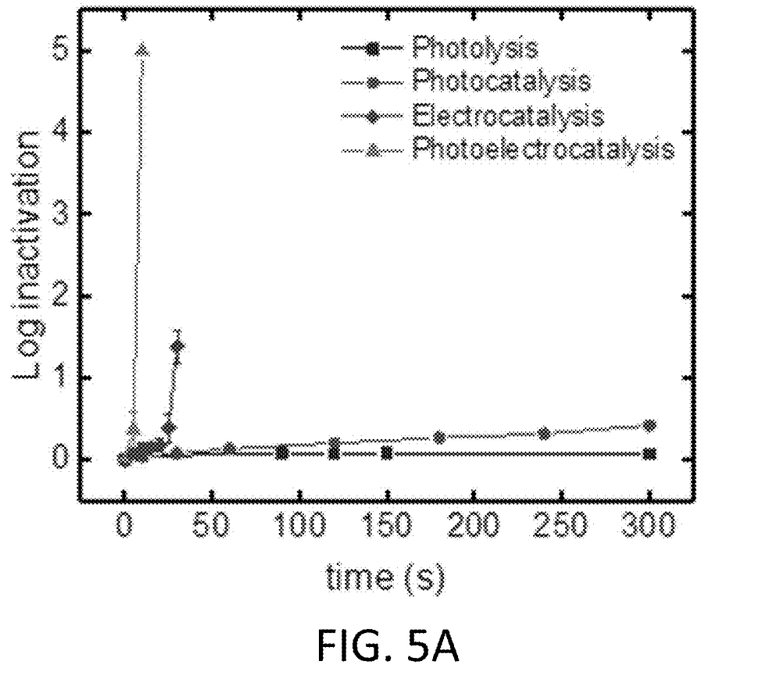
FIG. 5A shows *Escherichia coli* (*E. coli*) inactivation by the PEC device of FIG. 1A in photolysis, photocatalysis, electrocatalysis, and photoelectrocatalysis mode.

The disinfection potential of the PEC device was evaluated on the inactivation of $1 \times 10^5$ CFU $mL^{-1}$ of *E. coli*, the most widely used indicator organism for fecal contamination and is usually associated to diarrheal diseases. FIG. 5A shows the logarithm of inactivation of bacteria, the compliance monitoring parameter used to ensure that a treatment technology installed to treat drinking water reliably achieves at least 99% (2-log) inactivation of microorganisms. According to the U.S. Environmental Protection Agency (EPA), the Maximum Contaminant Level Goal (MCLG) for *E. coli* is set at zero. A positive result for *E. coli* can signify an acute maximum contaminant level violation that represents a direct health risk. The *E. coli* risk is higher for non-controlled water sources in rural areas, wells, or other water sources available outdoors for leisure activities.

Direct photolysis was conducted with the PEC device using a pristine Ti meshed inner cup (not nano-enabled $TiO_2$). Under irradiation with the monochromatic LED of characteristic emission at λ=365 nm (see FIG. 5A) no inactivation was observed. Note that only UVC radiation with λ, ranging at 100-280 nm has reported germicidal activity of *E. coli*, attaining 3-log inactivation under fluences of 9 mJ $cm^{-2}$. On the other hand, when a nano-enabled photoanode of $TiO_2$ nanotubes is used, a slight inactivation of 0.4-log was observed after 5 min of irradiation. Microorganism inactivation was associated to the photogeneration of oxidants following reactions (1) and (2).

Figure 5B:
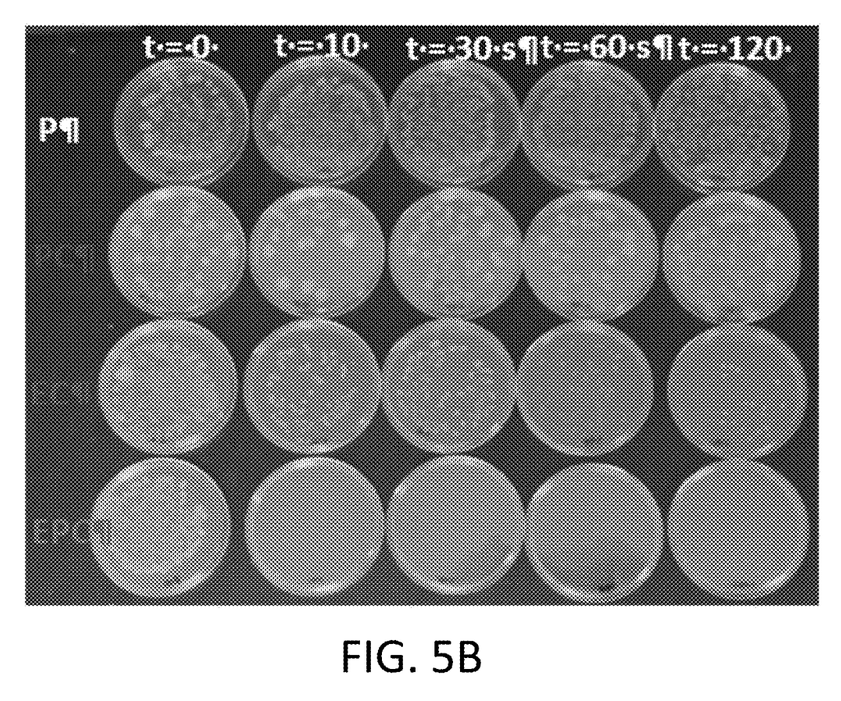
FIG. 5B shows plating assays over time to evaluate *E. coli* colony forming units (CFU) using the various modes of FIG. 5A.

In order to evaluate the electrocatalytic effect on *E. coli* inactivation, a constant current of 5 mA was applied in the dark (no illumination). The spread plate technique evidenced a CFU decrease during the treatment (see FIG. 5B) that can be attributed to the electrochemical generation of oxidant species. Data analysis shows an activation lag of 20 s followed by an exponential increase in log inactivation of up to 1.4-log in 30 s. This trend may be explained by the electrochemical activation of the surface and the time required to accumulate enough disinfecting oxidant species through continuous electrogeneration kinetics. ROS can be formed through direct charge transfer on anodes of high overpotential of oxygen evolution like $TiO_2$ nanotubes which depicted an onset potential of oxygen evolution at 2.5 V vs Ag|AgCl during the cyclic voltammetry analysis. For example, .OH can be electrogenerated in situ from water oxidation reaction (4) prior to oxygen evolution reaction (5). The number of oxidants accumulated is defined by the delivered number of electrons, therefore limited by the small values of applied current of 5 mA.

$$H_2O \rightarrow .OH + H^+ + 4e^- \quad (4)$$

$$2H_2O \rightarrow O_2 + 4H^+ + 4e^- \quad (5)$$

Figure 6A:
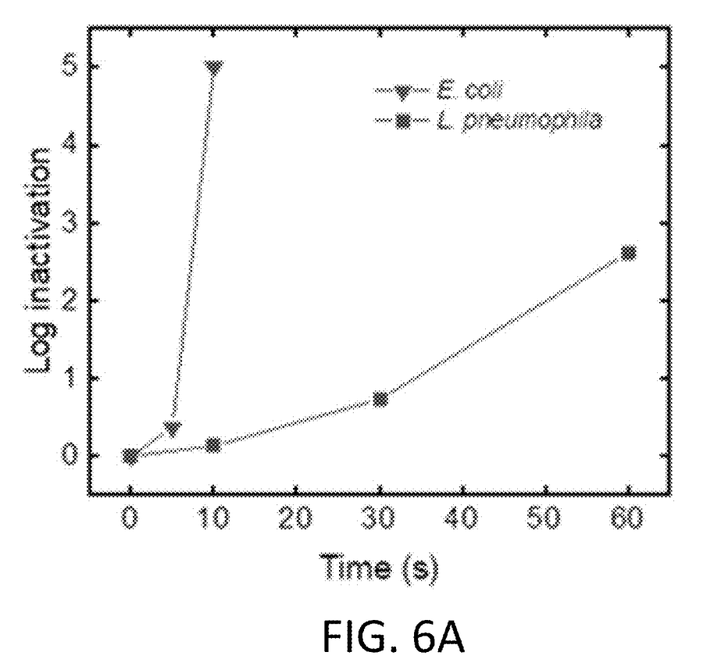
FIG. 6A shows bacterial inactivation using the PEC device of FIG. 1A in photoelectrocatalysis mode. The initial *E. coli* and *L. pneumophila* concentrations were $1\times10^5$ CFU/mL and $3.3\times10^5$ CFU/mL, respectively.

The photoelectrocatalytic treatment with the PEC device attains 5-log of *E. coli* inactivation after 10 s under UV light irradiation and 5 mA of current application supplied by a small rechargeable battery (see FIG. 6A). This enhancement can be explained by the synergistic interaction between delivered photons and the photoanodic current induced through the electrochemical circuit using the $TiO_2$ nanotubes as the photoanode. The applied anodic current plays a dual role in the photoelectrocatalytic treatment. First, it still contributes to the direct charge transfer that is responsible for .OH electrogeneration from water oxidation following reaction (4). Second, it stabilizes photogenerated charge carrier stimulating their separation by the induced difference of potential that extracts electrons from the external electrical circuit avoiding recombination reaction (3). This results in an enhancement of oxidant photogeneration through reactions (1) and (2).

A set of experiments with *L. pneumophila* were performed to further assess the disinfection capabilities of the PEC device under photoelectrocatalysis operation mode. *L. pneumophila* is a gram negative bacterium normally present in both natural and artificial water systems. *L. pneumophila* survive for long periods of time in water environments. As shown in FIG. 6A, photoelectrocatalytic treatment with the PEC device attained a 2.6-log *L. pneumophila* inactivation after 60 s of operation. These findings are believed to be due at least in part to the activity of oxidants (i.e., .OH) that oxidize the pathogen's intracellular components. The *L. pneumophila* results, compared to those of *E. coli* (5-log inactivation in 10 s), indicate that *L. pneumophila* is more resilient and requires longer treatment times even under a PEC treatment.

Figure 6B:
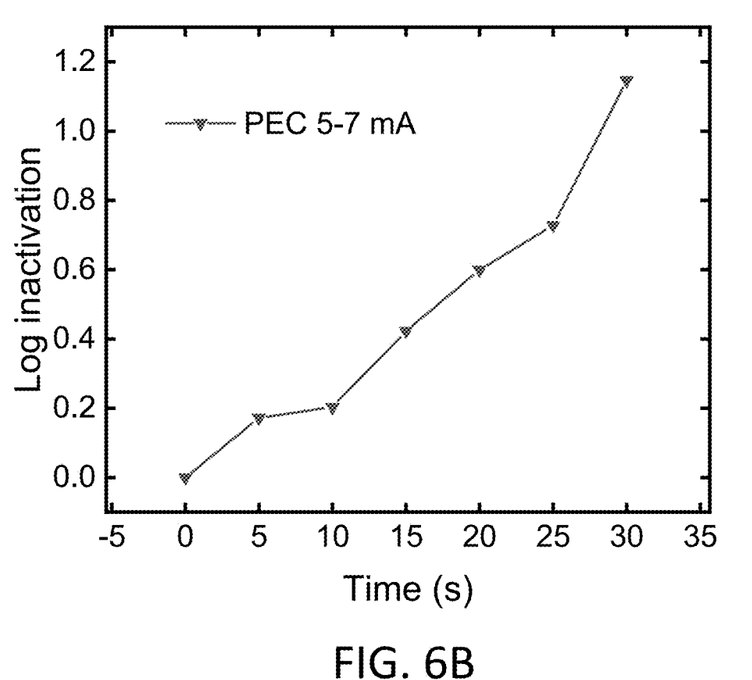
FIG. 6B shows *E. coli* inactivation using the PEC device of FIG. 1A in natural water samples. The initial *E. coli* concentration was $1\times10^5$ CFU/mL.

To validate the performance of the PEC device for real world applications, natural surface water was collected from the recreational reservoir within Pinetree forests in Arizona (USA) that is also used as a drinking water supply for a nearby town. The water quality characteristics of the collected water samples are shown in Table 1. The water samples show characteristic organic loads associated to natural organic matter (NOM). Due to the natural conductivity of 40.1 μS $cm^{-1}$, the addition of an electrolyte was not required for the photoelectrocatalytic treatment. The natural water samples were spiked with *E. coli* and photoelectrocatalytic disinfection was performed as described above. The PEC device achieved 1 log removal after 30 s of operation for this natural water sample, compared to ~5 s when measured in a simple saline solution (FIG. 6B). The slower inactivation rate observed in real water may be attributed to the presence of suspended solids and NOM, which will hinder the delivery of UV light to the electrode surface due to photon absorption by dissolved organics. Furthermore, NOM and dissolved ions compete on the consumption of generated ROS as parasitic reactions. Bulk organic matter degradation was not observed under such short time of photoelectrocatalytic treatment, and mineralization is known to require treatment times of hours and prolonged exposure to .OH radicals. Water characteristics of DOC, UV254 and SUVA did not appreciably change after disinfection treatment. However, trace organics can degrade in the presence of .OH even if bulk organics undergo no observable change. Nevertheless, rapid and highly efficient disinfection is still attained by the PEC and it can be estimated, based on a disinfection rate of 1.45 log min', that a 4 log removal of *E. coli* can be achieved in less than 4 min and in less than 6 min for a 5 log removal even under complex natural conditions. These short treatment times did not affect water characteristics reported in Table 1.

TABLE 1

| Natural water characteristics. | |
| --- | --- |
| Parameter | Characteristics |
| DOC | 6.83 mg $L^{-1}$ |
| $UV_{254}$ | 0.295 $cm^{-1}$ |
| SUVA | 4.32 L $mg^{-1}$ $m^{-1}$ |
| pH | 7.83 |
| Turbidity | 17 NTU |
| TSS | 13.6 mg $L^{-1}$ |
| Dissolved nitrogen | 0.359 mg N $L^{-1}$ |
| Total phosphorous | 0.101 mg P $L^{-1}$ |
| Dissolved oxygen | 9.22 mg $L^{-1}$ |
| Conductivity | 40.1 μS $cm^{-1}$ |

Implementation of photoelectrocatalytic technologies in scaled down and portable devices allow efficient water disinfection when using an off-grid point-of-use system. The use of LED light sources allows operation with low energy consumption, which enables powering disinfection treatment with a small rechargeable battery. Complete disinfection with 5-log *E. coli* inactivation in 10 s was achieved by using a compact PEC device with synthetic water samples with high ionic strength. Similarly, a 2.6-log *L. pneumophila* inactivation was achieved after 60 s of photoelectrocatalytic treatment using the PEC device.

A comparative study of the performance of photolytic, photocatalytic, electrocatalytic and photoelectrocatalytic disinfection was conducted. Bacteria inactivation with UVA light was not observed due to the small dose of photons delivered by small LED light sources. However, continuous photocatalytic inactivation mediated by photogenerated $h_{vb}^+$ and .OH was observed. Treatment times were reduced by direct electrogeneration of oxidants (i.e., .OH). However, synergistic interactions in the photoelectrocatalytic-driven processes attained complete bacteria inactivation in less than 10 s of operation under 5 mA. It was observed that inactivation is also attained during the treatment of natural waters, however longer inactivation times (4 min) may be required due the hindered light transport in the presence of organic solutes and other water matrix components. Inactivation of *E. coli* and *Legionella* was achieved without dramatically changing other water quality parameters.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A water-disinfecting apparatus comprising:
   a vessel comprising a cathode, wherein the cathode comprises an electrically conductive layer that defines an interior surface of the vessel;
   an insert configured to be positioned in the vessel, wherein the insert comprises a photoanode;
   an ultraviolet light source configured to be positioned in the insert; and
   a power source configured to be operably coupled to the cathode, the photoanode, and the light source.

2. The apparatus of claim 1, wherein the vessel has a volume of 1 L or less.

3. The apparatus of claim 1, wherein the vessel has a volume of 1 L or greater.

4. The apparatus of claim 1, wherein an outer surface of the vessel is electrically insulating.

5. The apparatus of claim 1, wherein the vessel is cylindrical.

6. The apparatus of claim 5, wherein the photoanode comprises a cylindrical metal substrate with a photoactive semiconductor material on an inner surface of the cylindrical metal substrate.

7. The apparatus of claim 6, wherein the cylindrical metal substrate defines openings configured to allow liquid to pass from an inside of the cylindrical metal substrate to the outside of the cylindrical substrate and vice versa.

8. The apparatus of claim 6, wherein the photoactive semiconductor material comprises titanium dioxide nanostructures.

9. The apparatus of claim 8, wherein the titanium dioxide nanostructures comprise titanium dioxide nanotubes.

10. The apparatus of claim 1, wherein the ultraviolet light source comprises a light emitting diode.

11. The apparatus of claim 10, wherein the ultraviolet light source is configured to emit ultraviolet radiation having a wavelength of 365 nm.

12. The apparatus of claim 1, wherein the power source comprises a rechargeable battery.

13. The apparatus of claim 1, wherein the vessel is a drinking vessel.

14. The apparatus of claim 13, wherein the drinking vessel comprises a removable lid.

15. The apparatus of claim 14, wherein the power source is removably coupled to the lid.

16. The apparatus of claim 1, wherein the vessel is configured to be operatively coupled to a water source.

17. The apparatus of claim 1, wherein the apparatus is configured to generate hydroxyl radicals from water in the vessel.

18. The apparatus of claim 17, wherein the power source is configured to provide a constant anodic current to inhibit recombination of reductant electrons and oxidant vacancies.

19. The apparatus of claim 1, wherein, when the insert is positioned in the vessel, an annular space is defined between an outer surface of the photoanode and an inner surface of the cathode.

20. The apparatus of claim 19, wherein the ultraviolet light source is configured to be positioned concentrically within the photoanode.

21. The apparatus of claim 1, wherein the apparatus is a self-disinfecting water bottle.

22. The apparatus of claim 1, wherein the cathode is configured to contain water in the vessel.

* * * * *